United States Patent
Ahn (10) Patent No.: US 12,423,844 B2
(45) Date of Patent: Sep. 23, 2025

(54) IMAGE PROCESSING SYSTEM AND IMAGE PROCESSING METHOD

(71) Applicant: SK hynix Inc., Icheon-si Gyeonggi-do (KR)

(72) Inventor: Sang Woo Ahn, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 84 days.

(21) Appl. No.: 18/334,818

(22) Filed: Jun. 14, 2023

(65) Prior Publication Data
US 2024/0193801 A1    Jun. 13, 2024

(30) Foreign Application Priority Data
Dec. 13, 2022   (KR) .................. 10-2022-0173798

(51) Int. Cl.
| | | |
|---|---|---|
| *G06T 7/571* | (2017.01) | |
| *G06T 7/593* | (2017.01) | |
| *H04N 13/218* | (2018.01) | |
| *H04N 13/271* | (2018.01) | |
| *H04N 23/80* | (2023.01) | |
| *H04N 25/702* | (2023.01) | |
| *H04N 13/00* | (2018.01) | |

(52) U.S. Cl.
CPC .............. *G06T 7/571* (2017.01); *G06T 7/593* (2017.01); *H04N 13/218* (2018.05); *H04N 13/271* (2018.05); *H04N 23/815* (2023.01); *H04N 25/702* (2023.01); *G06T 2207/20221* (2013.01); *H04N 2013/0081* (2013.01)

(58) Field of Classification Search
CPC .... H04N 23/815; H04N 13/271; G06T 7/571; G06T 7/593
See application file for complete search history.

(56) References Cited

U.S. PATENT DOCUMENTS

| | | | |
|---|---|---|---|
| 2014/0119603 A1* | 5/2014 | Jin | .......................... G06T 7/254 382/103 |
| 2014/0183334 A1 | 7/2014 | Wang et al. | |
| 2014/0204183 A1 | 7/2014 | Lee et al. | |
| 2019/0293792 A1* | 9/2019 | Keel | ..................... G01S 17/894 |
| 2019/0327393 A1* | 10/2019 | Yang | ..................... H04N 5/2226 |
| 2020/0342652 A1* | 10/2020 | Rowell | .................. G06V 10/82 |
| 2024/0078694 A1* | 3/2024 | Horiuchi | .................. G06T 7/60 |

FOREIGN PATENT DOCUMENTS

| | | |
|---|---|---|
| KR | 102111181 B1 | 5/2020 |
| KR | 1020210012437 A | 2/2021 |

\* cited by examiner

*Primary Examiner* — Zhubing Ren
(74) *Attorney, Agent, or Firm* — WILLIAM PARK & ASSOCIATES LTD.

(57) ABSTRACT

An image processing system includes an image sensor including a pixel array including first pixels corresponding to a first phase difference degree and second pixels corresponding to a second phase difference degree. The image processing system also includes an image set manager for generating a first image set corresponding to a first resolution, based on pixel values of the first pixels, and generating a second image set corresponding to a second resolution, based on pixel values of the second pixels. The image processing system further includes an image synthesizer for generating first depth information, based on the first image set, generating second depth information, based on the second image set, and generating a synthetic image of the first image set and the second image set, based on the first depth information and the second depth information.

19 Claims, 8 Drawing Sheets

IMAGE PROCESSING SYSTEM AND IMAGE PROCESSING METHOD

CROSS-REFERENCE TO RELATED APPLICATION

The present application claims priority under 35 U.S.C. § 119(a) to Korean patent application number 10-2022-0173798 filed on Dec. 13, 2022, in the Korean Intellectual Property Office, the entire disclosure of which is incorporated by reference herein.

BACKGROUND

1. Technical Field

The present disclosure generally relates to an image processing system, and more particularly, to an image processing system and an image processing method.

2. Related Art

An image sensor may be generally divided into a Charge Coupled Device (CCD) image sensor and a Complementary Metal Oxide Semiconductor (CMOS) image sensor. Recently, the CMOS image sensor which has low manufacturing cost, low power consumption, and easy integration with a peripheral circuit has received attention.

An image sensor included in a smartphone, a tablet PC, a digital camera, and the like may convert light reflected from an external object into an electrical signal, thereby acquiring image information on the external object. An image processing device may perform operations of converting an electrical signal acquired from the image sensor or improving image quality.

The image sensor may include microlenses corresponding to pixels. The image sensor senses an image by performing a Phase Detection Auto Focus (PDAF) function. As the PDAF function is performed, a phase difference degree of the image sensor may be limited.

A depth of an image which the image sensor can sense may be limited according to the phase difference degree, and hence an image different from an actual image may be sensed. The image processing device may correct depth information of an image, thereby improving the quality of the image. The image processing device can improve the accuracy of an image sensed through an image processing operation, despite the depth limitation of the image sensor.

SUMMARY

Some embodiments provide an image processing system and an image processing method in which a plurality of depth information is acquired using pixel values received from pixels having different phase difference degrees, and a synthetic image is generated according to depth information obtained by merging the acquired information.

In accordance with an embodiment of the present disclosure, an image processing system includes: an image sensor including a pixel array including first pixels corresponding to a first phase difference degree and second pixels corresponding to a second phase difference degree; an image set manager configured to generate a first image set corresponding to a first resolution, based on pixel values of the first pixels, and generate a second image set corresponding to a second resolution, based on pixel values of the second pixels; and an image synthesizer configured to generate first depth information, based on the first image set, generate second depth information, based on the second image set, and generate a synthetic image of the first image set and the second image set, based on the first depth information and the second depth information.

In accordance with the present disclosure, an image processing method includes: receiving pixel values having different phase difference degrees from the same device; generating a main image set, based on first pixel values corresponding to a first phase difference degree among the pixel values and generating a sub-image set, based on second pixel values corresponding to a second phase difference degree among the pixel values; generating main depth information and sub-depth information, based on the main image set and the sub-image set; and generating a synthetic image of the main image set and the sub-image set, based on the main depth information and the sub-depth information.

BRIEF DESCRIPTION OF THE DRAWINGS

Example embodiments will now be described more fully hereinafter with reference to the accompanying drawings; however, they may be embodied in different forms and should not be construed as being limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Specific structural and functional descriptions disclosed herein are merely illustrative for the purpose of describing embodiments according to the concept of the present disclosure. The embodiments according to the concept of the present disclosure can be implemented in various forms and should not be construed as limited to the embodiments set forth herein.

Hereinafter, embodiments of the present disclosure will be described in detail with reference to the accompanying drawings for those skilled in the art to be able to implement the technical spirit of the present disclosure.

Figure 1:
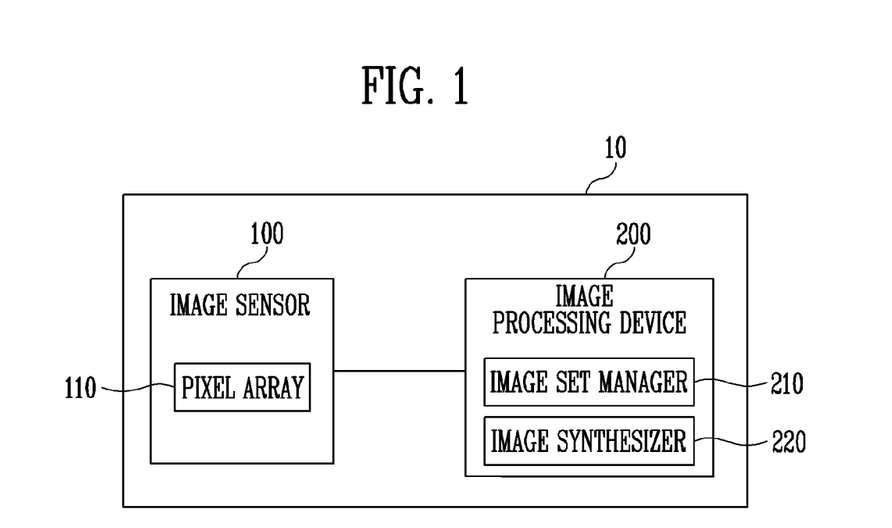
FIG. 1 is a diagram illustrating an image processing system in accordance with an embodiment of the present disclosure.

FIG. 1 is a diagram illustrating an image processing system in accordance with an embodiment of the present disclosure.

Referring to FIG. 1, the image processing system 10 may include an image sensor 100 and an image processing device 200.

The image processing system 10 in accordance with the embodiment of the present disclosure may acquire image data and process the acquired image data. The image processing system 10 may store, display, or output, to an external device, an output image on which an image processing operation is performed. The image processing system 10 may output the output image to a host according to a request of the host. The image processing system 10 perform the image processing operation, based on the image data, so that the accuracy of image sensing can be improved.

The image sensor 100 may generate image data, based on received light. The image sensor 100 may include a pixel array 110 including pixels. The pixels may generate pixel values. Each of the pixel values may include brightness information and phase information.

In an embodiment of the present disclosure, phase difference degrees of the pixels included in the pixel array 110 may be different from each other. Depth information of an image may vary according to a phase difference degree of the pixels. For example, as the phase difference degree becomes larger, the range of a depth which can be expressed in an image may become larger. The phase difference degree of the pixels may have influence on a pixel value. The image sensor 100 may transmit, to the image processing device 200, pixel values generated according to different phase difference degrees.

The image sensor 100 may include microlenses. A binocular disparity between the pixels included in the image sensor 100 may vary according to a microlens. The image sensor 100 may include pixels having different binocular disparities. The image sensor 100 may generate pixel values corresponding to the pixels having the different binocular disparities, and transmit the generated pixel values to the image processing device 200.

The image processing device 200 may process pixel values received from the image sensor 100. The processing may be Electronic Image Stabilization (EIS), interpolation, color tone correction, image quality correction, size adjustment, or the like.

In an embodiment of the present disclosure, the image processing device 200 may include an image set manager 210 and an image synthesizer 220. The image processing device 200 may calculate depth information of an image sensed based on the pixel values.

The image set manager 210 may generate image sets having different resolutions, based on the pixel values. Each of the image sets may include a left image and a right image. The image set manager 210 may equally change the resolutions of the image sets by upscaling a resolution of an image set having a low resolution among the image sets.

The image synthesizer 220 may generate depth information of the image sets, and generate a synthetic image, based on the generated depth information. The image synthesizer 220 may generate depth information, based on a phase difference between a left image and a right image of an image set. The image synthesizer 220 can improve the accuracy of the generated image through an image synthesizing operation.

Figure 2:
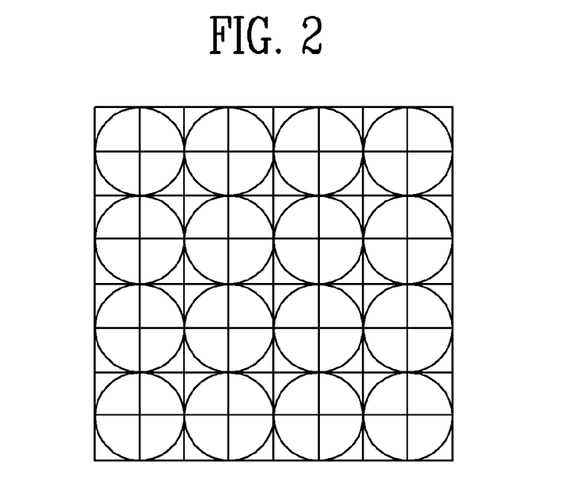
FIG. 2 is a diagram illustrating a normal image sensor and microlenses.

FIG. 2 is a diagram illustrating a normal image sensor and microlenses.

Referring to FIG. 2, microlenses may be located above pixels. One microlens may correspond to a plurality of pixels. In FIG. 2, it may be assumed that four pixels share one microlens.

When a plurality of pixels correspond to the same lens, a phase difference may occur between the pixels. The image processing device may generate phase information on the pixels corresponding to the same microlens by using the phase difference. The image sensor may perform a Phase Detection Auto Focus (PDAF) operation by using the generated phase information. The phase difference on which the image sensor can perform the PDAF operation may be limited.

The microlenses shown in FIG. 2 all have the same feature, and therefore, the image sensor may transfer pixel values having the same phase difference degree to the image processing device. The image processing device may generate one left image and one right image, based on the received pixel values.

The image processing device may calculate depth information, based on a phase difference between the left image and the right image. The phase difference degree of the image sensor shown in FIG. 2 is limited, and therefore, the range of a depth of an image which the image sensor can sense may be limited. When the range of the depth of the image is out of a depth range which can be sensed, the accuracy of image sensing may be lowered.

Figure 3:
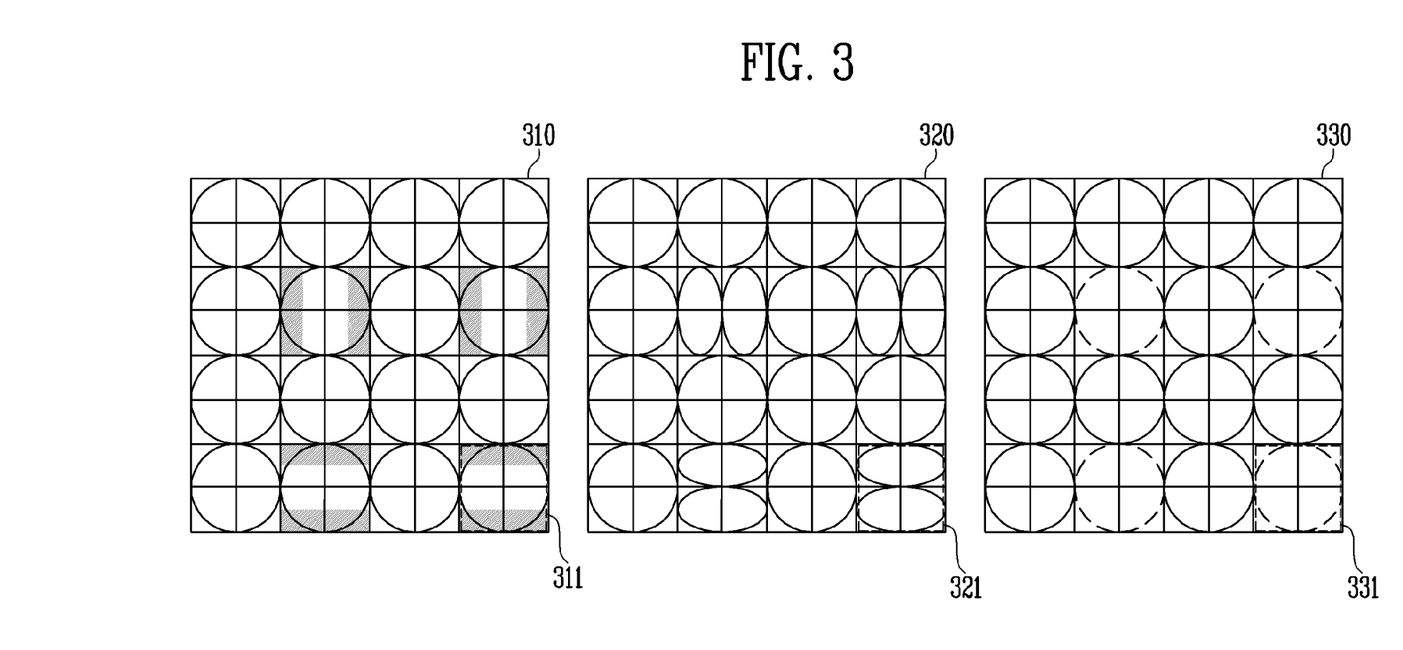
FIG. 3 is a diagram illustrating a pixel array and microlenses in accordance with an embodiment of the present disclosure.

FIG. 3 is a diagram illustrating a pixel array and microlenses in accordance with an embodiment of the present disclosure.

Referring to FIG. 3, cases where a phase difference degree of some microlenses among microlenses varies (310, 320, and 330) may be illustrated. An arrangement pattern of the microlenses shown in FIG. 3 is merely an embodiment, and a case where a phase difference degree varies may be various.

In an embodiment of the present disclosure, the pixel array may include first pixels corresponding to a first phase difference degree and second pixels corresponding to a second phase difference degree. The first phase difference degree may be smaller than the second phase difference degree. The first phase difference degree may be a phase difference degree to which the image sensor can perform a PDAF function.

In an embodiment of the present disclosure, the image sensor may generate first pixel values corresponding to the first phase difference degree and second pixel values corresponding to the second phase difference degree. The generated first pixel values and the generated second pixel values may be transmitted to the image processing device.

Some of the microlenses may include a blocking object having a predetermined shape (310). The blocking object may block a portion of an optical signal passing through the microlens. The blocking object 311 for blocking a portion of the microlens may be a metal shield. The kind of the blocking object may be various.

In an embodiment of the present disclosure, the blocking object may be located between the microlens and pixels. The blocking object may block a portion of an optical signal passing through the microlens. For example, the blocking object may be included in some microlenses among the microlenses shown in FIG. 2.

In another embodiment, the blocking object may be located above the microlens. The blocking object may block a portion of an optical signal incident onto the microlens. For example, the blocking object may be located above some microlenses among the microlenses shown in FIG. 2.

Some of the microlenses may be paired with adjacent two pixels (320). A phase difference degree corresponding to microlenses 321 with which adjacent two pixels are paired may be different from a phase difference degree corresponding to microlenses with which another number of pixels are paired. The arrangement of microlenses having different numbers of pixels paired therewith may be various.

Some of the microlenses may have different lens characteristics (330). In an embodiment of the present disclosure, some of the microlenses shown in FIG. 2 may be removed and then be replaced with microlenses 331 having a lens characteristic different from a lens characteristic of the some microlenses. When lens characteristics are different from each other, phase difference degrees may be different from each other even when numbers of paired pixels are the same. Specifically, thicknesses, focal distances, and the like of lenses may be different from each other.

The image sensor may include a plurality of microlenses which transfer an optical signal to a predetermined number of pixels. The plurality of microlenses may include first microlenses which transfer an optical signal to the first pixels and second microlenses which transfer an optical signal to the second pixels. The first microlenses may generate the first phase difference degree between the first pixels. Similarly, the second microlenses may generate the second phase difference degree between the second pixels.

In an embodiment of the present disclosure, the second microlenses may include a blocking object 311, be microlenses 321 each paired with two pixels, or be microlenses 331 having a lens characteristic different from a lens characteristic of the first microlenses. The first microlenses may be microlenses each paired with four pixels.

In an embodiment of the present disclosure, among the pixels included in the pixel array, a ratio of the first pixels may be greater than a ratio of the second pixels. That is, the number of second pixels may be relatively smaller than the number of first pixels. An image generated based on the first pixel values may have a resolution or a size, which is higher or greater than a resolution or a size of an image generated based on the second pixels.

In another embodiment of the present disclosure, a first binocular disparity of the first pixels, which is generated by the first microlenses, may be different from a second binocular disparity of the second pixels, which is generated by the second microlenses. The second binocular disparity may be greater than the first binocular disparity. The image sensor may include pixels having different binocular disparities. The image sensor may generate pixel values corresponding to the pixels having the different binocular disparities and transmit the generated pixel values to the image processing device.

Figure 4:
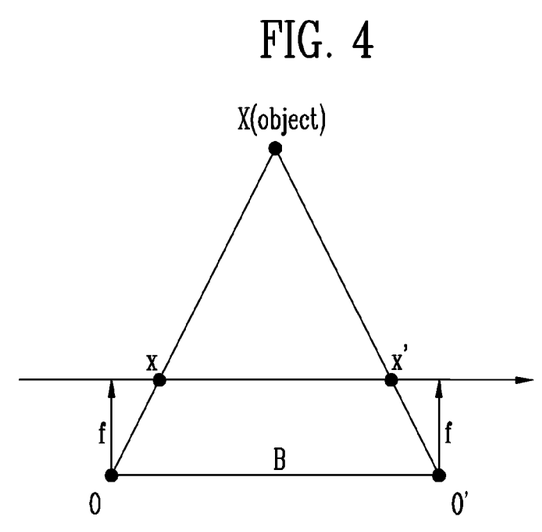
FIG. 4 is a diagram illustrating microlenses having different phase difference degrees in accordance with an embodiment of the present disclosure.

FIG. 4 is a diagram illustrating microlenses having different phase difference degrees in accordance with an embodiment of the present disclosure.

Referring to FIG. 4, a case where an object X is sensed by considering a binocular disparity x-x' may be illustrated. Starting points O and O' may exist at the back of sensing positions x and x'. A focal distance f may be a distance between the starting points O and O' and the sensing positions x and x', and a distance between the starting points O and O' may be a base line B.

For the image sensor to perform the PDAF function, the binocular disparity x-x', the focal distance f, or the base line B may be limited. In an embodiment of the present disclosure, a depth range in which the image sensor can sense an image while performing the PDAF function may be increased. A phase difference degree of some of microlenses corresponding to pixels may be changed.

Specifically, the base line B may be changed when some of the microlenses include a blocking object having a predetermined shape (310). The base line B is changed, so that an object located more distant from the object X may be detected. The focal distance f may be changed when some of the microlenses are paired with adjacent microlenses (320) and when some of the microlenses are replaced with microlenses having a lens characteristic different from a lens characteristic of the some microlenses (330).

In an embodiment, the focal distance f and the base line B may be increased. As the focal distance f and the base line B are increased, the sensing accuracy of a deeper place may be improved. The sensing accuracy of a deep place in an image may be improved by using a microlens in which the area of a blocking object is increased or a microlens of which focal distance d is long.

A relationship between the focal distance f and the base line B with respect to the binocular disparity x-x' has already been disclosed, and therefore, its detailed descriptions need not be repeated in this specification.

Figure 5:
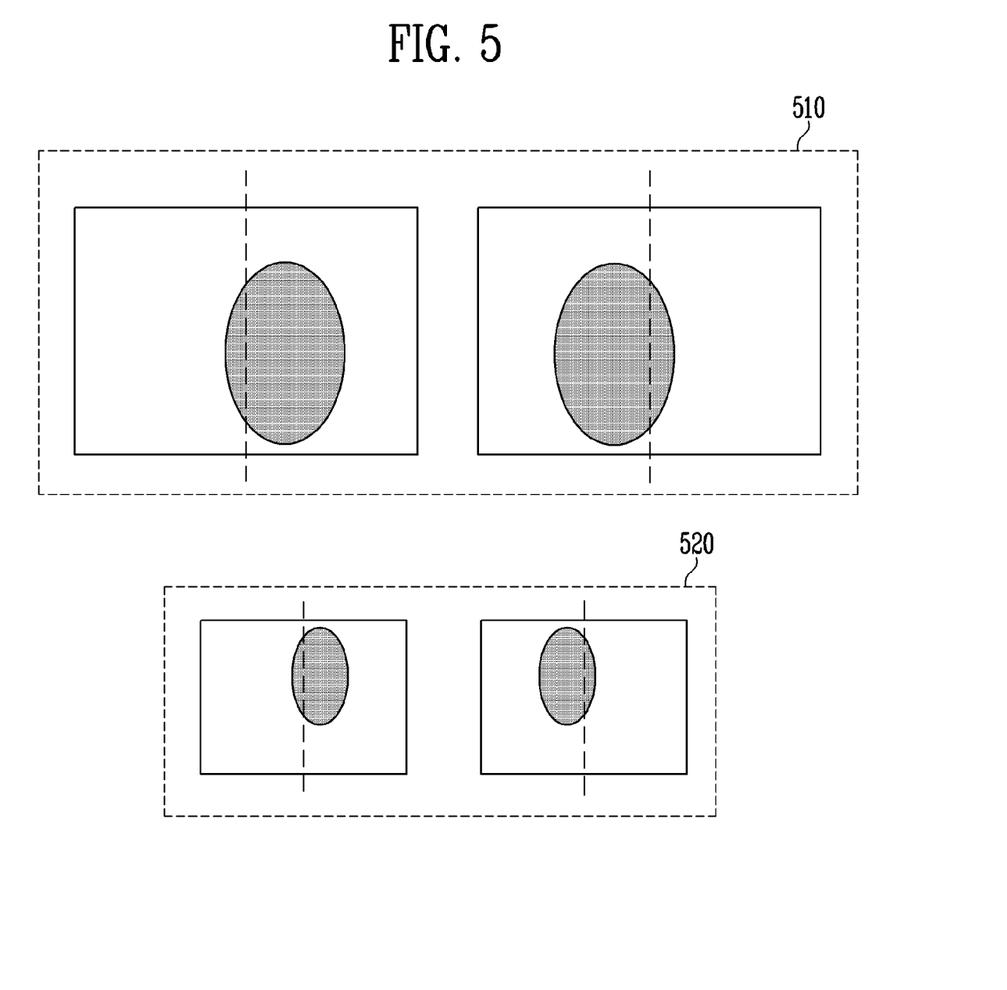
FIG. 5 is a diagram illustrating image sets in accordance with an embodiment of the present disclosure.

FIG. 5 is a diagram illustrating image sets in accordance with an embodiment of the present disclosure.

Referring to FIG. 5, the image set manager may generate an image set, based on pixel values. The image set manager may generate an image set including a left image and a right image and may change a size of the generated image set.

The image set manager may generate different image sets, based on pixel values having different phase difference degrees. The image set manager may generate a first image set 510, based on first pixel values corresponding to a first phase difference degree. The image set manager may generate a second image set 520, based on second pixel values corresponding to a second phase difference degree.

The first image set 510 may include a left image and a right image. An object of the left image may be biased to the right, and an object of the right image may be biased to the left.

The first image set 510 may sensitively represent a portion at which the depth of an image corresponding to the first phase difference degree is shallow. An object located within a constant distance from the image sensor may be sensitively sensed. When a depth in the first image set 510 is out of the depth of the image corresponding to the first phase difference degree, sensing accuracy may be decreased.

The image set manager may generate a left image and a right image of the second image set 520, which correspond to the second phase difference degree, based on pixel values of second pixels. The first phase difference degree may be smaller than the second phase difference degree. The second image set 520 may sensitively represent a portion at which the depth of an image corresponding to the second phase difference degree is deep. In the second image set 520, a depth range in which the image sensor can sense an image may be wide regardless of a phase difference degree limited by the PDAF function.

Because a number of pixels corresponding to the first image set 510 is greater than a number of pixels corresponding to the second image set 520, a size of the first image set 510 is greater than a size of the second image set 520. Similarly, a first resolution of the first image set 510 may be higher than a second resolution of the second image set 520.

In an embodiment of the present disclosure, the size of the first image set 510 may be different from the size of the second image set 520. The resolution of the second image set 520 or the size of an image may vary according to a ratio of pixels having different phase difference degrees among the pixels included in the image sensor.

The image set manager may upscale the size of the second image set to be equal to the size of the first image set. For example, a size of the right image of the first image set and a size of the right image of the second image set may be equally adjusted, and a size of the left image of the first image set and a size of the left image of the second image set may be equally adjusted.

The image set manager may upscale the second resolution of the second image set to be equal to the first resolution of the first image set. The upscaling may be performed through an image interpolation operation. In some embodiments, image interpolation operation associated with the upscaling may correspond to a technique known in the art.

Figure 6:
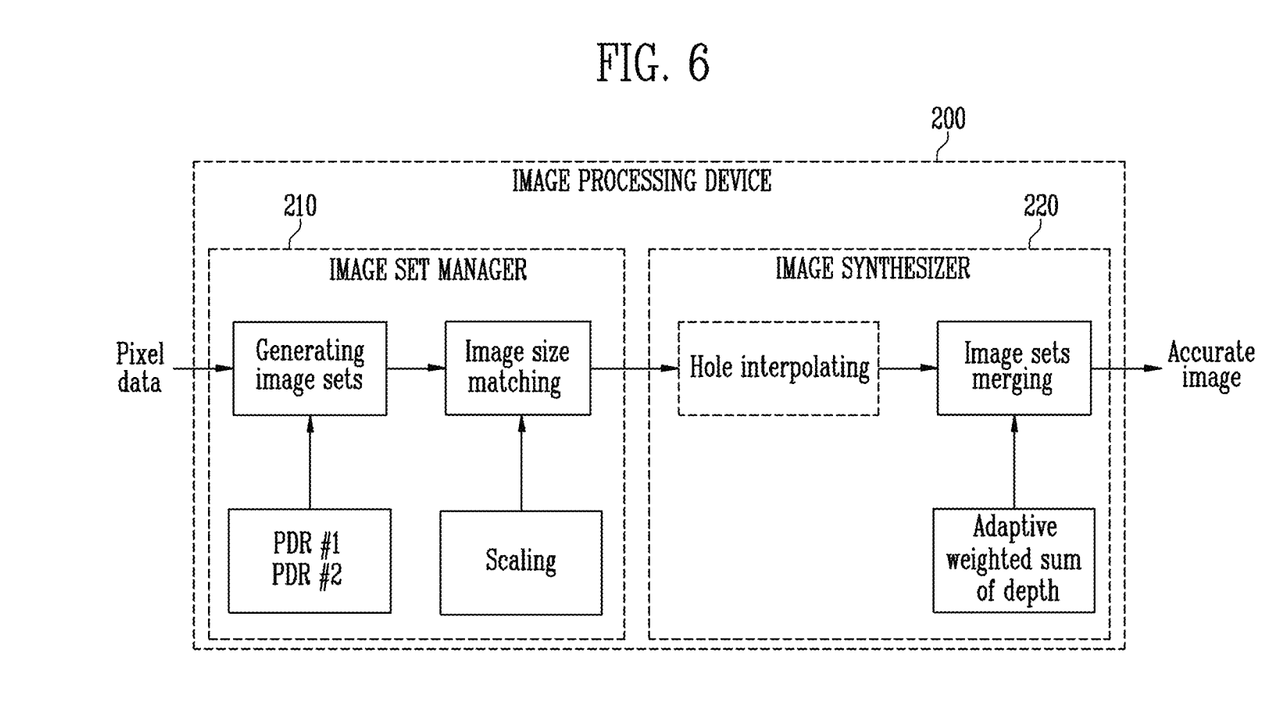
FIG. 6 is a diagram illustrating an image processing device for generating a synthetic image in accordance with an embodiment of the present disclosure.

FIG. 6 is a diagram illustrating an image processing device for generating a synthetic image in accordance with an embodiment of the present disclosure.

Referring to FIG. 6, the image processing device 200 may receive pixel data, and generate a synthetic image having improved depth accuracy through an image processing operation. The pixel data may include first pixel values corresponding to a first phase difference degree and second pixel values corresponding to a second phase different degree.

The image set manager 210 may generate a first image set, based on the first pixel values, and generate a second image set, based on the second pixel values. A phase difference degree of the first image set may have smaller than a phase difference degree of the second image set. A resolution of the first image set may be higher than the second image set.

The image set manager 210 may equally adjust the resolutions or image sizes of the first image set and the second image set. The image set manager 210 may upscale the resolution or image size of the second image set.

The image synthesizer 220 may perform an interpolation operation on a portion which is not sensed according to the phase difference degrees by using the first image set and the upscaled second image set. Different portions may exist in the first image set and the second image set, corresponding to that the phase difference degree of the first image set and the phase difference degree of the second image set are different from each other.

In an embodiment of the present disclosure, the image synthesizer 220 may detect a first hole as a portion which is not sensed in the first image set due to a first phase difference degree, and perform the interpolation operation on the first hole, based on the second image set. Similarly, the image synthesizer 220 may detect a second hole as a portion which is not sensed in the second image set due to a second phase difference degree, and perform the interpolation operation on the second hole, based on the first image set.

The process of detecting the first hole and the second hole and performing the interpolation operation on the first hole and the second hole may be omitted. In some embodiments, the interpolation operation on the first hole and the second hole may correspond to a technique known in the art.

The image synthesizer 220 may generate a synthetic image obtained by synthesizing the first image set and the second image set. The image synthesizer 220 may generate first depth information, based on the first image set, and generate second depth information, based on the second image set. In an embodiment of the present disclosure, the image synthesizer 220 may generate a depth map.

The image synthesizer 220 may generate the first depth information, based on a phase difference between a left image and a right image of the first image set. The image synthesizer 220 may generate the second depth information, based on a phase difference between a left image and a right image of the second image set.

The image synthesizer 220 may generate target depth information of the synthetic image, based on the first depth information and the second depth information. The image synthesizer 220 may determine weight values of pixels of the synthetic image, based on the first depth information and the second depth information. The image synthesizer 220 may generate the target depth information of the synthetic image, which is obtained by merging the first depth information and the second depth information, according to the weight values.

The image synthesizer 220 may determine a range of depth information according to a phase difference degree. The image synthesizer 220 may determine a first range, based on the first phase difference degree, and determine a second range, based on the second phase difference degree. A depth of the synthetic image in the first range may be shallower than a depth of the synthetic image in the second range.

In an embodiment of the present disclosure, the weight values with respect to the depth information may vary according to the depth of the synthetic image. Specifically, the image synthesizer 220 may determine a weight value with respect to the first depth information to be greater than a weight value with respect to the second depth information, corresponding to that the depth of the synthetic image is the first range. Similarly, the image synthesizer 220 may determine the weight value with respect to the second depth information to be greater than the weight value with respect to the first depth information, corresponding to that the depth of the synthetic image is the second range.

Figure 7:
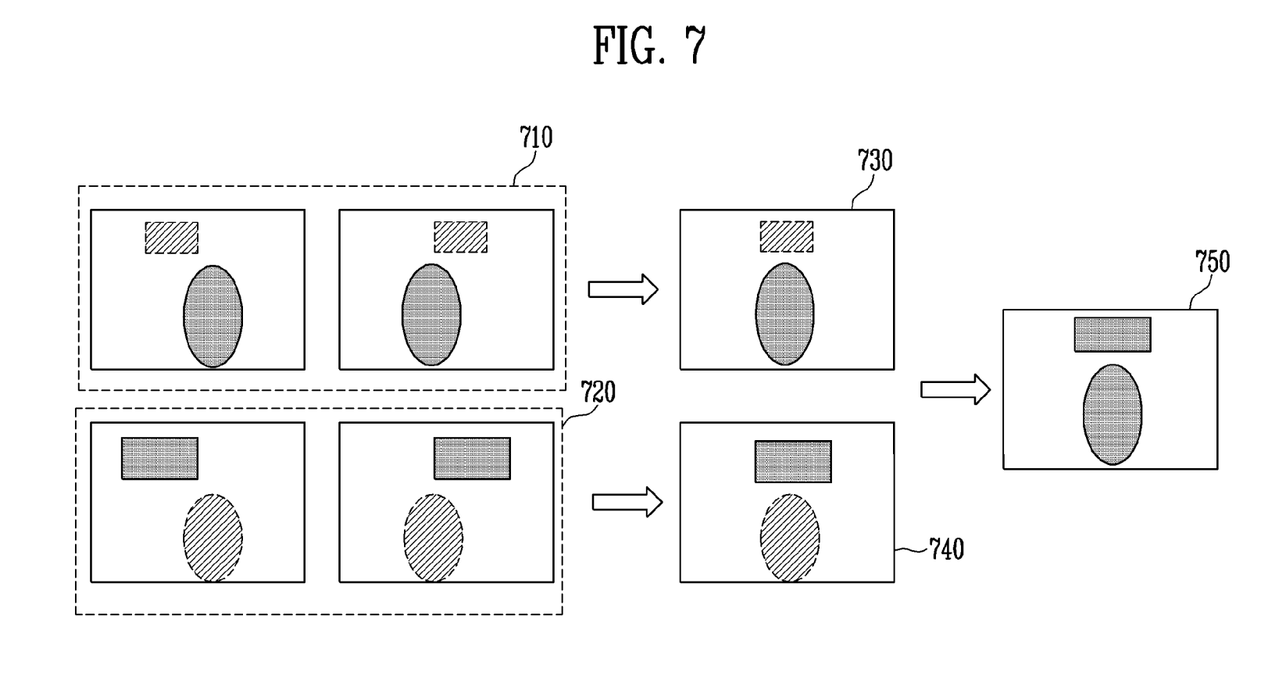
FIG. 7 is a diagram illustrating a method of merging depth information in accordance with the present disclosure.

FIG. 7 is a diagram illustrating a method of merging depth information in accordance with the present disclosure.

FIG. 7 may be described together with the components shown in FIG. 6. Referring to FIG. 7, the image synthesizer 220 may generate depth information, based on a first image set 710 and a second image set 720, and calculate target depth information through a weighted sum. Figures included in images may represent objects. A figure indicated by a dotted line and a slash may represent a figure having a low accuracy of depth information. A figure indicated by shades may represent a figure having a high accuracy of depth information.

It may be assumed that a resolution of the first image set 710 is equal to a resolution of the upscaled second image set 720. A size of the first image set 710 and a size of the second image set 720 may be the same.

The image synthesizer 220 may generate first depth information 730, based on a left image and a right image of the first image set 710. An elliptical object of which depth corresponds to a first range in the first image set 710 may be displayed as a shaded figure, and a rectangular object of which depth corresponds to a second range may be indicated by a dotted line and a slash. An accuracy of a depth of an elliptical object included in the first depth information 730 may be higher than an accuracy of a depth of a rectangular object included in the first depth information 730. In an embodiment of the present disclosure, the first depth information 730 may have a high sensing accuracy with respect to the object included in the first range.

The image synthesizer 220 may generate second depth information 740, based on a left image and a right image of the second image set 720. A rectangular object of which depth corresponds to the second range in the second image set 720 may be displayed as a shaded figure, and an elliptical object of which depth corresponds to the first range may be indicated by a dotted line and a slash. The second depth information 740 may have a high sensing accuracy with respect to the object included in the second range.

In an embodiment of the present disclosure, the first depth information and the second depth information 740 may have a complementary relationship. The image synthesizer 220 may calculate the target depth information through weighted merging of the first depth information 730 and the second depth information 740. The image synthesizer 220 may determine a weight value of the first depth information 730 to become high, corresponding to that a depth of a synthetic image is the first range, and determine a weight value of the second depth information 740 to become high, corresponding that the depth of the synthetic image is the second range.

In an embodiment of the present disclosure, an equation in which depth information are weighted-summed may be shown as follows.

$$\text{Depth} = \text{depth1} * WGT + \text{depth2} * (1 - WGT)$$

Depth may be target depth information, depth1 may be first depth information, depth2 may be second depth information, and WGT may be a weight value. The above equation is merely an embodiment in which the target depth information is calculated, and a method of weighted-summing a plurality of depth information may be various.

In the target depth information 750, the depth accuracy of an object included in the second range, which cannot be accurately represented only using the first depth information, can be improved. For example, a high weight value may be provided to the elliptical object in the first depth information 730, and a high weight value may be provided to the rectangular object in the second depth information 740. When the weighted sum is performed, depth information having a high accuracy can be generated, as compared with an image sensor corresponding to one phase difference degree.

Figure 8:
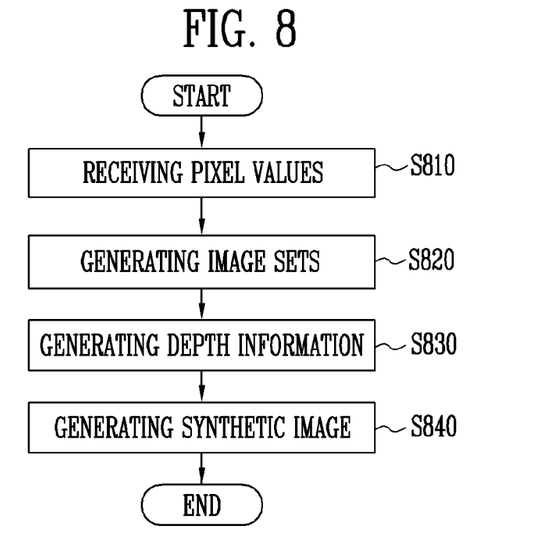
FIG. 8 is a diagram illustrating a method of generating a synthetic image in accordance with the present disclosure.

FIG. 8 is a diagram illustrating a method of generating a synthetic image in accordance with the present disclosure.

FIG. 8 may be described together with the components shown in FIG. 6. Referring to FIG. 8, the image processing device 200 may generate a plurality of depth information by using pixel values having different phase difference degrees, and generate a synthetic image by weighted-summing the plurality of depth information. In an embodiment of the present disclosure, a plurality of image sets may be generated using the same image sensor. A plurality of image sets and a plurality of depth information are generated in the same image sensor, and thus the accuracy of image alignment can be improved in image synthesis.

In step S810, the image set manager 210 may receive pixel values having different phase difference degrees. The image set manager 210 may receive the pixel values from the same image sensor. The pixel values may include first pixel values corresponding to a first phase difference degree and second pixel values corresponding to a second phase difference degree.

In step S820, the image set manager 210 may generate image sets, based on the pixel values. The image set manager 210 may generate a main image set, based on the first pixel values, and generate a sub-image set, based on the second pixel values. In an embodiment of the present disclosure, a resolution of the main image set may be higher than a resolution of the sub-image set.

In step S830, the image synthesizer 220 may generate main depth information and sub-depth information, based on the main image set and the sub-image set. The main image set may have a high depth accuracy in a first range determined according to the first phase difference degree. The sub-image set may have a high depth accuracy in a second range determined according to the second phase difference degree.

In step S840, the image synthesizer 220 may generate target depth information of a synthetic image by weighted-summing the main depth information and the sub-depth information. The image synthesizer 220 may generate the synthetic image, based on the target depth information. The image synthesizer 220 may correct a sensing image according to the target depth information. A depth accuracy of the synthetic image may be higher than a depth accuracy of an output image of an image sensor corresponding to one phase difference degree.

Figure 9:
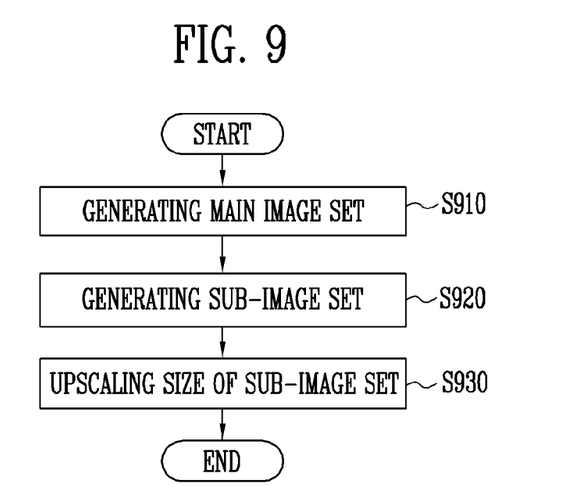
FIG. 9 is a diagram illustrating a method of generating image sets in accordance with the present disclosure.

FIG. 9 is a diagram illustrating a method of generating image sets in accordance with the present disclosure.

FIG. 9 may be described together with the components shown in FIG. 6. Referring to FIG. 9, the image set manager 210 may generate a main image set and a sub-image set. The image set manager 210 may equally scale sizes of a main image and a sub-image by considering a ratio difference between a first pixel and a second pixel, which are included in the pixel array. Size adjustment of the images and image alignment may be performed before the images are synthesized.

In step S910, the image set manager 210 may generate a main image set, based on first pixel values. The main image set may include a left image and a right image, which correspond to a first phase difference degree smaller than a second phase difference degree.

The image set manager 210 may perform a dead pixel correction operation on second pixel values. A ratio of the second pixels may be smaller than a predetermined value such that the dead pixel correction operation is smoothly performed. For some embodiments, the dead pixel correction operation may correspond to a technique known in the art.

In step S920, the image set manager 210 may generate a sub-image set, based on the second pixel values. Like the main image set, the sub-image set may also include a left image and a right image, which correspond to the second phase difference degree. A number of second pixels is smaller than a number of first pixels, and therefore, a size of the sub-image set may be smaller than a size of the main image set.

In step S930, the image set manager 210 may upscale the size of the sub-image set to be equal to the size of the main image set. The image synthesizer 220 may generate a synthetic image by synthesizing the image sets generated by the image set manager 210. The image set manager 210 may adjust the sizes of the image sets and align images.

Figure 10:
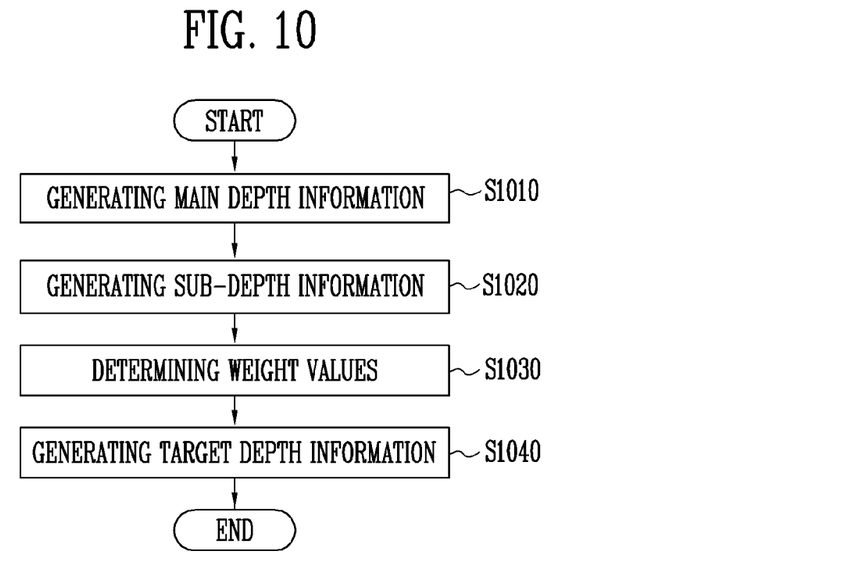
FIG. 10 is a diagram illustrating a method of generating depth information of a synthetic image in accordance with the present disclosure.

FIG. 10 is a diagram illustrating a method of generating depth information of a synthetic image in accordance with the present disclosure.

FIG. 10 may be described with the components shown in FIG. 6. Referring to FIG. 10, the image synthesizer 220 may generate a plurality of depth information, based on generated image sets. The image synthesizer 220 may calculate target depth information by weighted-summing the plurality of depth information. Depth information having different phase difference degrees are included in the target depth information, and therefore, the accuracy of depth information may be high.

In step S1010, the image synthesizer 220 may generate main depth information, based on a phase difference between a left image and a right image of a main image set.

In step S1020, the image synthesizer 220 may generate sub-depth information, based on a phase difference between a left image and a right image of a sub-image set. The main depth information and the sub-depth information may have different ranges in which accuracy is high.

In step S1030, the image synthesizer 220 may determine weight values used for merging of a synthetic image, based on the main depth information and the sub-depth information.

The image synthesizer 220 may determine a first range in which a weight value of the main depth information is greater than a weight value of the sub-depth information, based on a first phase difference degree. The image synthesizer 220 may determine a second range in which the weight value of the sub-depth information is greater than the weight value of the main depth information.

The image synthesizer 220 may determine weight values corresponding to the first range, based on the main depth information. The image synthesizer 220 may determine weight values corresponding to the second range, based on the sub-depth information.

In step S1040, the image synthesizer 220 may generate target depth information of the synthetic image, which is obtained by merging the main depth information and the sub-depth information, based on the weight values.

The image synthesizer 220 may generate the synthetic image, based on the target depth information. The image synthesizer 220 may correct sensing image according to the target depth information.

Figure 11:
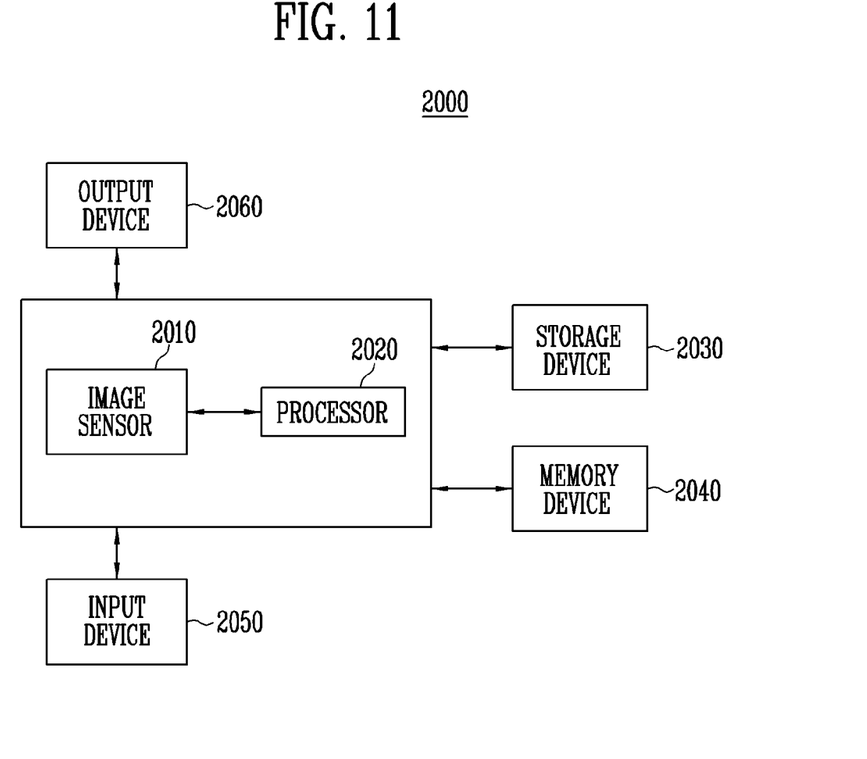
FIG. 11 is a block diagram illustrating an electronic device including an image processing system in accordance with an embodiment of the present disclosure.

FIG. 11 is a block diagram illustrating an electronic device 2000 including an image processing system in accordance with an embodiment of the present disclosure.

Referring to FIG. 11, the electronic device 2000 may include an image sensor 2010, a processor 2020, a storage device 2030, a memory device 2040, an input device 2050, and an output device 2060. Although not shown in FIG. 11, the electronic device 2000 may further include ports capable of communicating with a video card, a memory card, a USB device, and the like, or communicating with other electronic devices.

The image sensor 2010 may generate image data corresponding to incident light. The output device 2060 may display the image data. The storage device 2030 may store the image data. The processor 2020 may control operations of the image sensor 2010, the storage device 2030, and the output device 2060.

In an embodiment of the present disclosure, the image sensor 2010 may include microlenses corresponding to pixels. A phase difference degree of the pixels may vary according to the microlenses. The image sensor 2010 may generate pixel values having phase difference degrees.

The processor 2020 may perform specific calculations or specific tasks. The processor 2020 may execute and control an operation of the electronic device 2000. In accordance with an embodiment of the present disclosure, the processor 2020 may be a microprocessor, a Central Processing Unit (CPU), or an Application Processor (AP).

The processor 2020 may be implemented as a chip independent from the image sensor 2010. For example, the processor 2020 may be implemented with a multi-chip package. In another embodiment of the present disclosure, the processor 2020 may be included as a portion of the image sensor 2010 to be implemented as one chip.

The processor 2020 may be connected to the storage device 2030, the memory device 2040, the input device 2050, and the output device 2060 through an address bus, a control bus, and a data bus, to perform communication. In accordance with an embodiment of the present disclosure, the processor 2020 may also be connected to an expansion bus such as a Peripheral Component Interconnect (PCI) bus.

In an embodiment of the present disclosure, the processor 2020 may generate image sets having different phase difference degrees, based on pixel values having different phase difference degrees. The processor 2020 may generate a plurality of depth information, based on the image sets, and generate depth information of a synthetic image by weighted-summing the plurality of depth information. The processor 2020 may correct a sensing result of the image sensor 2010, based on the depth information of the synthetic image. The depth information generated based on the pixel values having the different phase difference degrees can be accurate as compared with depth information generated based on pixel values having the same phase difference degree.

The storage device 2030 may include a flash memory device, a Solid-State Drive (SSD), a Hard Disk Drive (HDD), a CD-ROM, all types of nonvolatile memory devices, and the like.

The memory device 2040 may store data necessary for an operation of the electronic device 2000. The memory device 2040 may include volatile memory, such as Dynamic Random-Access Memory (DRAM) or a Static Random-Access Memory (SRAM), or nonvolatile memory, such as Erasable Programmable Read-Only Memory (EPROM), Electrically Erasable Programmable Read-Only Memory (EEPROM), or flash memory. The processor 2020 may control the image sensor 2010 and the output device 2060 by executing a command set stored in the memory device 2040.

The input device 2050 may include an input means such as a keyboard, a keypad, or a mouse, and the output device 2060 may include an output means such as a printer or a display.

The image sensor 2010 may be implemented with various types of packages. For example, components of at least a portion of the image sensor 2010 may be implemented by using packages such as Package-on-Package (POP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi-Chip Package (MCP), Wafer-level Fabricated Package (WFP), Wafer-level Processed Stack Package (WSP), and Wafer-level Processed Package (WSP).

In some embodiments, the image sensor 2010 along with the processor 2020 may be integrated in one chip or may be respectively integrated in different chips.

Meanwhile, the electronic device 2000 may be interpreted as all computing systems using the image sensor 2010. The electronic device 2000 may be implemented in the form of a packaged module, a component, or the like. For example, the electronic device 2000 may be implemented as a digital camera, a mobile device, a smart phone, a Personal Computer (PC), a tablet PC, a notebook computer, a Personal Digital Assistant (PDA), an Enterprise Digital Assistant (EDA), a Portable Multimedia Player (PMP), a wearable device, a black box, a robot, an autonomous vehicle, or the like.

In accordance with the present disclosure is an image processing system capable of improving the depth measuring ability of the image sensor.

While the present disclosure has been shown and described with reference to certain embodiments thereof, it will be understood by those skilled in the art that various changes in form and/or detail may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or some of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image processing system comprising:
   an image sensor including a pixel array including first pixels corresponding to a first phase difference degree and second pixels corresponding to a second phase difference degree;
   an image set manager configured to:
   generate a first image set corresponding to a first resolution, based on pixel values of the first pixels, the first image set includes a left image and a right image of the first image set,
   generate a second image set corresponding to a second resolution, based on pixel values of the second pixels, the second image set includes a left image and a right image of the second image set, and
   upscale the resolution of the second image set such that the first resolution and the second resolution become equal to each other; and
   an image synthesizer configured to:
   generate first depth information, based on a phase difference between the left image and the right image of the first image set,
   generate second depth information, based on a phase difference between the left image and the right image of the second image set, and generate a synthetic image of the first image set and the second image set, based on the first depth information and the second depth information.

2. The image processing system of claim 1, wherein the image set manager generates the left image and the right image of the first image set corresponding to the first phase difference degree, based on the pixel values of the first pixels.

3. The image processing system of claim 2, wherein the first phase difference degree is smaller than the second phase difference degree, and
   wherein the image set manager generates the left image and the right image of the second image set corresponding to the second phase difference degree, based on the pixel values of the second pixels.

4. The image processing system of claim 1, wherein the image synthesizer determines weight values of pixels of the synthetic image, based on the first depth information and the second depth information, and generates target depth information of the synthetic image, which is obtained by merging the first depth information and the second depth information according to the weight values.

5. The image processing system of claim 4, wherein the image synthesizer determines a weight value of the first depth information to be higher than a weight value of the second depth information, corresponding to that a depth of the synthetic image is a first range.

6. The image processing system of claim 5, wherein the image synthesizer determines a weight value of the second depth information to be higher than a weight value of the first depth information, corresponding to that a depth of the synthetic image is a second range.

7. The image processing system of claim 6, wherein the image synthesizer determines the first range, based on the first phase difference degree, and determines the second range, based on the second phase difference degree.

8. The image processing system of claim 6, wherein the first range has a depth of the synthetic image, which is shallower than a depth of the synthetic image in the second range.

9. The image processing system of claim 4, wherein the image synthesizer generates the synthetic image, based on the target depth information.

10. The image processing system of claim 1, wherein the image synthesizer detects a first hole as a portion which is not sensed in the first image set due to the first phase difference degree, and performs an interpolation operation on the first hole, based on the second image set.

11. The image processing system of claim 10, wherein the image synthesizer detects a second hole as a portion which is not sensed in the second image set due to the second phase difference degree, and performs an interpolation operation on the second hole, based on the first image set.

12. The image processing system of claim 1, wherein the image sensor includes a plurality of microlenses which transfer an optical signal to a predetermined number of pixels, wherein the plurality of microlenses include first microlenses which transfer the optical signal to the first pixels and second microlenses which transfer the optical signal to the second pixels, and wherein the first microlenses generate the first phase difference degree between the first pixels, and the second microlenses generate the second phase difference degree between the second pixels.

13. The image processing system of claim 12, wherein the second microlenses include a blocking object having a predetermined shape, and wherein the blocking object blocks a portion of the optical signal transferred to the second pixels.

14. The image processing system of claim 12, wherein a first binocular disparity of the first pixels, which is generated by the first microlenses, is different from a second binocular disparity of the second pixels, which is generated by the second microlenses, and wherein the second binocular disparity is greater than the first binocular disparity.

15. The image processing system of claim 12, wherein a ratio of the first pixels corresponding to the first microlenses among the pixels included in the pixel array is greater than a ratio of the second pixels corresponding to the second microlenses among the pixels included in the pixel array.

16. An image processing method comprising:
receiving pixel values having different phase difference degrees from the same device;
generating a main image set, based on first pixel values corresponding to a first phase difference degree among the pixel values, the main image set includes a left image and a right image of the main image set;
generating a sub-image set, based on second pixel values corresponding to a second phase difference degree among the pixel values, the sub-image set includes a left image and a right image of the sub-image set;
upscaling a size of the sub-image set such that a size of the main image set and the size of the sub-image set become equal to each other;
generating main depth information based on a phase difference between the left image and the right image of the main image set;
generating sub-depth information, based on a phase difference between the left image and the right image of the sub-image set; and
generating a synthetic image of the main image set and the sub-image set, based on the main depth information and the sub-depth information.

17. The image processing method of claim 16, wherein generating the main image set includes generating the left image and the right image of the main image set corresponding to the first phase difference degree smaller than the second phase difference degree, based on the first pixel values; and
wherein generating the sub-image set includes generating the left image and the right image of the sub-image set corresponding to the second phase difference degree, based on the second pixel values.

18. The image processing method of claim 16, wherein generating the synthetic image includes:
determining weight values used for merging of the synthetic image, based on the main depth information and the sub-depth information;
generating target depth information of the synthetic image, which is obtained by merging the main depth information and the sub-depth information, based on the weight values; and
generating the synthetic image, based on the target depth information.

19. The image processing method of claim 18, wherein determining the weight values includes:
determining a first range in which a weight value of the main depth information is greater than a weight value of the sub-depth information, based on the first phase different degree;
determining a second range in which a weight value of the sub-depth information is greater than a weight value of the main depth information, based on the second phase difference degree; and
determining the weight values corresponding to the first range, based on the main depth information, and determining the weight values corresponding to the second range, based on the sub-depth information.

\* \* \* \* \*